Feb. 17, 1970 D. M. DIMITROV 3,495,900

METHOD OF CHAIN-TYPE SYNCHRONIZATION IN A PLURALITY OF CAMERAS

Filed Feb. 9, 1967

United States Patent Office 3,495,900
Patented Feb. 17, 1970

3,495,900
METHOD OF CHAIN-TYPE SYNCHRONIZATION IN A PLURALITY OF CAMERAS

Dimiter Mihailov Dimitrov, Sofia, Bulgaria, assignor to Nautchno-Izsledovatelski Institut Po Kinematografia I Radio, Sofia, Bulgaria Filed Feb. 9, 1967, Ser. No. 614,935
Claims priority, application Bulgaria, Feb. 9, 1966, 1–133
Int. Cl. G03b 31/04
U.S. Cl. 352—5 11 Claims

ABSTRACT OF THE DISCLOSURE

An arrangement wherein a plurality of recording devices are operated in overlapping time sequence and the recorded media of each device are marked or visually cued in such manner to indicate the beginning of operation of each device and its ending whereby the recorded media can be combined with continuity by editing, cutting and splicing.

BRIEF SUMMARY OF THE INVENTION

The invention relates to the incorporation of two or more cameras in a complex technical device providing for the entire or partial filming of long scenes of films, the filming itself being effected in separate cameras in succession in chain-like manner.

According to methods employed in cinema production, the action is played and shot in small sections called sequences which are subsequently put together to create the impression of continuity. This is a slow procedure which involves high costs of production and it has an unfavorable effect on the artistic qualities of the particular film. It often results in the familiar stiffness in film acting since frequent interruptions break the continuity and make it difficult for the actors to play their parts in a creative manner.

In the case of television, the pickup is made without interruption, and by means of several electronic cameras, usually three, the picture is transmitted again without interruption, from one camera to another. This is known as a live pickup. Its shortcomings result from technical and actors' errors during the performance which are seen by the viewing audience.

Another variation provides for recording the electronic picture on film. Such apparatus, no matter how perfect they may be, possess one shortcoming in principle, namely, that the film camera, by virtue of the effect of the shutter, can only record one-half of the lines of the TV image. The picture obtained is rather dull, with screen effects, and lacks sharpness.

Yet another method involves recording the picture on magnetic tape. Technically, the picture in this case is very good, but a shortcoming is that the tape cannot be edited. This makes it necessary to shoot very long scenes. Hence, a disadvantage is that in the case of technical or artistic errors it is necessary to repeat the entire scene. Thereby, the freshness of the original performance is lost, actors and actresses are apt to show fatigue, much time is lost in studio work, etc. This method has its origins and is widely used in the filming of documentary events.

Also familiar is a method according to which, instead of three electronic cameras, use is made of three movie cameras, connected in a special maner with an electronic sight, which shoot the scenes without interruption, the sound being recorded on magnetic tape. Technically, the quality of the picture obtained is very good and the film can easily be edited and joined together from several pieces. Light signals or markings or cues are photographed all the time the respective film camera is operating. These markings consist of tracer lines whose number corresponds to the number of the film camera. The sound is recorded on a sound band, while the sound cues consist of sounds of various frequencies differentiating between the separate film cameras. The sound cues are recorded on a track parallel to the sound track.

This method finds no application in cinematograph film production. The principal cause is the low artistic level of the films shot in this manner, due to the TV technique of stage setting and direction which brings everything to the foreground, semi-profile images instead of full face, lack of precision in the composition of the particular sequence, plane-type TV illumination, theatrical routine instead of freshness of performance, etc. The following are the essential shortcomings of this method:

(1) The need to shoot very long sections without interruption.

(2) The need to operate always with three cameras.

(3) The need for montage cuttings to be made in a special studio—hence longer delays in studio—more complex technical rehearsals, fatigue in the actors and actresses, etc.

(4) The montage became a technical rather than an artistic type of operation.

(5) Technical difficulties involved in the shooting and selection of variants, etc.

The present invention directed to a chain-type synchronization of picture and sound avoids the shortcomings listed above and the following is achieved without technical difficulty:

(1) The possibility of shooting entire episodes without undue regard for the artistic approach, in addition to precision in taking the motion picture, i.e. each camera operates independently, as in ordinary film-making.

(2) The possibility to shoot with the same ease very brief episodes, of the order of several seconds, and very long episodes lasting up to 15 minutes.

(3) The possibility to insert sound or silent sections, after the principle adapted in cinematography.

(4) The possibility to use one, two, three, or more cameras according to the requirements of the particular scene, the artistic concepts of the producer, decoration, etc. without disrupting the method.

(5) The possibility of using one camera only, as if there were no other cameras, using the same artistic and technical methods as employed in cinema production, without disrupting the method.

(6) The possibility of shooting and of selecting single variants, following the motion picture principle.

(7) The possibility to preserve the precision and technological process of the montage using the method of cinematography, i.e. making use of the montage or cutting as a type of artistic activity.

(8) The possibility for the existing technology of film production to be organized in an entire cycle, as well as for making use of the apparatus and devices available for film production (cameras, montage tables, tape-recorders, and the like) without any reconstruction. Thus, such apparatus and devices are used for the purposes for which they have originally been designed and without modification.

DETAIL DESCRIPTION OF THE INVENTION

Figure 1:
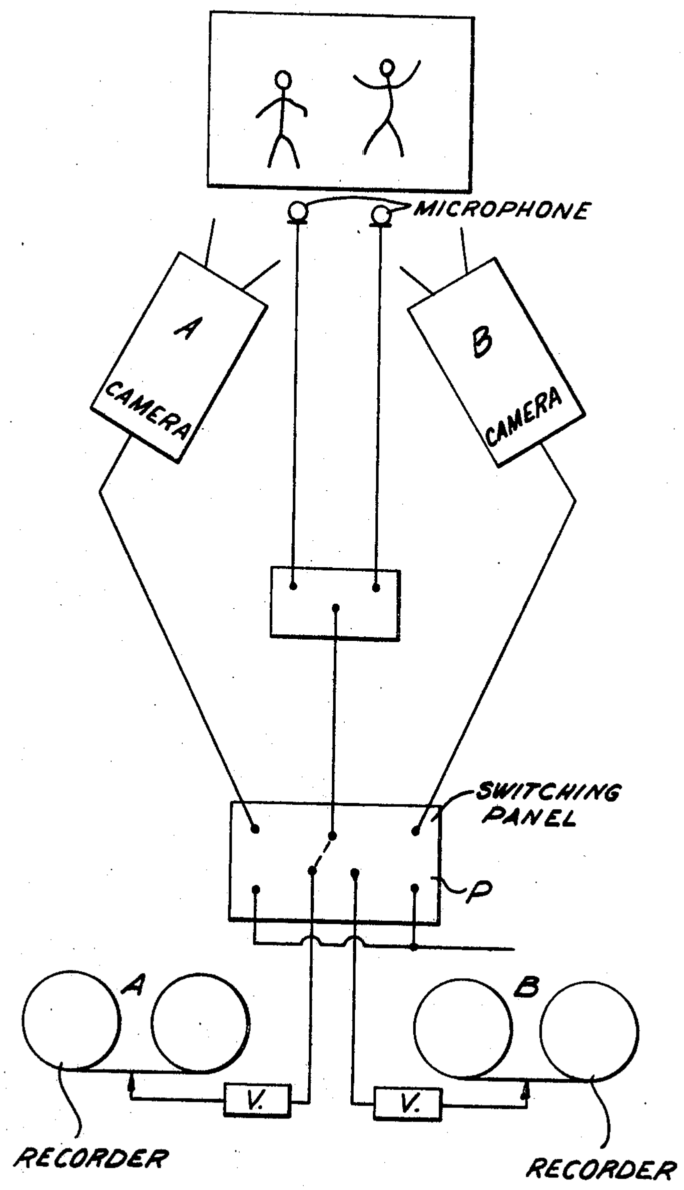
FIGURE 1 diagrammatically shows an arrangement for filming and recording a sequence with two cameras and two microphones.

FIG. 1 shows an arrangement wherein a scene is filmed by camera A, then through the switching panel P the filming is taken by camera B, then it is again transferred to camera A, etc. Material is saved in this manner as was the case with the method referred to with use of three film cameras.

Diagrammatically, the method of chain-type synchronization is represented in the following manner:

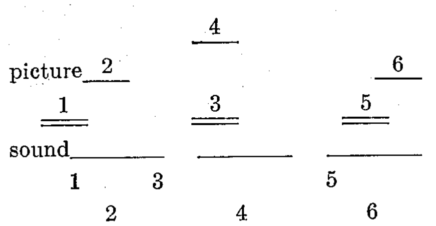

It is obvious that "picture" and "sound" overlap one another in a chain-like fashion and, respectively, they are repeated.

The invention provides for the use of a separate tape-recorder (or in a system employing a common recorder, a system of separate sound track markings or cues) for each camera, the sound being subject to recording only when the corresponding camera is operating. In this manner through parallel recording and repeated recording of sound and picture, it is possible to obtain automatic sorting in a consecutive manner of picture and sound for each camera on a pair of equal rollers which leads to a great simplification of the technology and artistic practice involved in the process of cutting and editing.

The starting sound cue may, as one variant of the technical solution, be contained in the sound track of the basic sound, since it is repeated in the overlapping chain-type variant. This makes it possible to use tape recorders and cutting tables available in film manufacture without any reconstruction whatever.

In order to obtain a "linkage" of the chain between the separate cameras at the moment of their overlapping, the sound-picture cue is fed in a particular manner. More specifically, in addition to feeding it to the operating camera at its beginning it is fed to all other cameras as well, regardless of the fact whether they are working or not. This is diagrammatically shown in FIG. 2 wherein signals are concurrently fed to cameras A and B when two cameras are used and cameras A, B and C when three cameras are used.

The camera which is beginning or ending operation receives a basic sound-light cue according to which the start or ending can subsequently be determined, while the remaining cameras obtain the same cue entirely or partially as an additional marking for determining the spot where the same camera has started to operate or has ended operation, respectively.

The basic and the additional cue can be placed on one and the same surface of the film or in a combination of various surfaces.

Additionally, the basic and the additional cues are fed with a pre-arranged number of impulses and this makes it possible to apply the method to an unlimited number of cameras.

As a result of the application of the principle of the differentiated feeding of the sound-and-light cues, it is possible to shoot synchronous scenes with a musical underscore with the utmost precision of time.

There will next be described the various means by which the method according to the invention can be realized. Principally, this involves characteristic cueing of the picture and sound.

(I) Marking the light pulse (picture marking identical with light marking)

Figure 3:
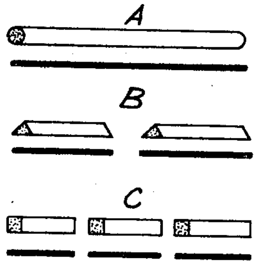
FIGURE 3 shows various profile images used for distinguishing respective cameras.
Figure 4:
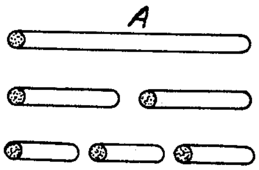
FIGURE 4 shows various numbers of pulses of the same profile for distinguishing respective cameras.

The light pulse is marked or cued twice in each shooting sequence, namely, at the basic marking or start and at an additional marking or end. A particular profile behind which a source of light has been positioned, exposes on the film the image characteristic adopted for each camera. This is done in the following manner:

(a) By regulating the light of the bulb which serves to illuminate the profile it is possible to create an image similar to a sensitometric wedge as a result of the heat inertia in the filament. The favorable light intensity found for a particular cine-material, in view of the saltatory travel of the tape, will not result in tracing and so the image of the profile will be exposed on the film (FIG. 3).

(b) The image of the profile can be exposed on the cine-film and, through the light of a glow-lamp or another device of ionized light, or through a spot spark, fed by an A.C. source of a particular frequency.

(II) Cueing or marking the sound pulse

The sound pulse may have a different pre-arranged frequency for each camera separately or a total frequency for all cameras.

(a) The sound cue (pulse) can be placed on an additional band parallel to the sound track, or it can be recorded through the head of the tape recorder, and placed at an angle in the sound track.

(b) The sound cue (pulse) can lie in the sound track, and during the montage operations it is deleted together with the light cue.

(III) Differentiating between the basic and additional cues or markings

Figure 2:
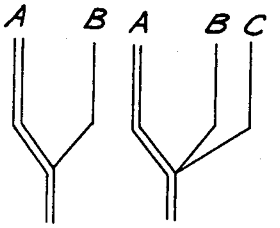
FIGURE 2 is a diagrammatic illustration showing signals being concurrently fed to cameras A and B when two cameras are being used, and cameras A, B and C when three cameras are used.

The following methods are utilized for the purpose of differentiating between the basic and additional cues or markings:

(1) The basic cue consists of one sound and one light pulse, whereas the additional cue may consist of: (a) only one light pulse and no sound pulse (FIG. 2); (b) only a sound pulse and no light pulse (FIG. 2); (c) a sound and a light pulse, the differentiation being realized from differences in the all-round pre-arrangement of the marking, for instance, by the provision of another shape or profile for the same pulse.

(2) The light pulse of the basic cue may be in the field of the film sequence, the light pulse of the additional cue lying in the sound track.

Figure 5:
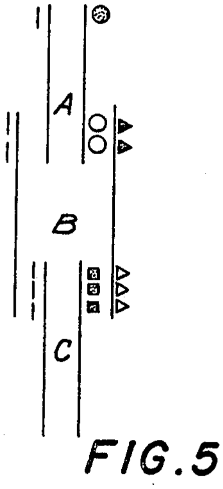
FIGURE 5 is a diagrammatic showing of the recording of successive film and sound media with basic and secondary markings.

The differentiation is rendered easier through a combination of the solutions referred to in items 1(*a*), *b*, *c* above. The combination which is the preferred one for the method is that in which the basic cue has a sound component, while sound is absent in the additional cue (FIG. 5).

(IV) The sound-and-light cueing consists of a pre-arranged number of cues characteristic for each camera separately This has the advantage of using sound signals of different frequencies in that during the accelerated hand- or motor-operated searching for the start, the same can be found unmistakably by the number of pulses regardless of the film speed.

However, the basic advantage offered by the system of cueing with a pre-arranged number of pulses lies in the possibility of faultlessly differentiating between the basic and additional cues of any number of cameras.

Pre-arranged numbers of pulses are fed both for the basic and for the additional cueing. For instance, camera A receives a continuous (uninterrupted) pulse, camera B receives the same pulse in an interrupted form, i.e. two pulses, a third camera C receives three pulses (FIG. 3). One desirable feature of this pre-arranged amplitude interruptions is that the sound and light impulses are equal in interruptions.

(V) Combination between a pre-arranged number of pulses and a pre-arranged shape or profile of the sound-and-light cues for each camera The utilization of the combination of number of cues and shape of the cues makes it possible on a practical basis to employ the method with an unlimited number of cameras. As an example a combination of profiles can be utilized, a circle for camera A, a triangle for camera B and a square for camera C. The outlines of figures can also be used for each camera, or a different number of the same profiles can be used for each camera (camera A—one profile, camera B—two of the same profiles, camera C—three of the same profiles).

In this manner, using the two variables, namely, pre-arranged number of pulses and different shapes (or different number of the same shapes) of the light cues, the montage technician can be unmistakably orientated with respect to the basic cueing (the start) and the additional cueing (the connection between the separate cameras).

In the first chain-type variant we have:

| | |
|---|---|
| (A) Number of profiles, one profile; Number of pulses, one pulse. | Basic initial start of first camera (one pulse will be expected in the sound-track). |

Further in the same sequence we see:

| | |
|---|---|
| Number of profiles, one profile; number of pulses, three pulses. | When the first camera was working, at the same place parallel to it the third camera has begun to work. (In the sound-track sound-pulse is not expected, for in the cited example, the additional cue is without sound-pulse). |

In the next sequence we have:

| | |
|---|---|
| (B) Number of profiles, three profiles; number of pulses, three pulses. | Initial start of third camera (sound track will have three pulses). |

Further in the same sequence we see:

| | |
|---|---|
| Number of profiles, three profiles; number of pulses, two pulses. | When third camera was working, at the same place and parallel the second camera has begun to operate, (In the sound-track a sound pulse is not expected.) |

In the next sequence we have:

| | |
|---|---|
| (C) Number of profiles, two profiles; number of pulses, two pulses. | Initial start of second camera (the sound-track will have two pulses). |

When the number of profiles corresponds to the number of pulses—this is the initial start of the camera assigned said number (the sound track will have the same number of pulses).

When the number of profiles does not correspond to the number of pulses, the number of the profiles shows the camera operating at that moment, while the number of the pulses indicates the initial start of the camera which begins operating.

In this manner it is easy to determine the basic and additional cues of any number of cameras.

As an example we take two profiles that are the same, whose number is different for the different cameras. That is more convenient for tracing because, for example, three profiles with three pulses, means initial start of the third camera. One profile with one pulse—initial start of the first camera, etc., except that, we took as a profile a circular surface. Practically, the same is most easily obtained, because the forming of a round surface in the camera is done with a round bore. Instead of number of profiles, profiles of different shapes can be used—for example: circular, triangular, square, etc., on condition that for each shape we determine the respective pulse. In FIG. 3 for the circular shape, one pulse is used, for the triangular—two, for the square—three pulses. Whether the number of profiles or profiles with different shapes are used, does not change the essence of the method.

(VI) Devices for the practical realization of the method of the invention (1) With this invention, the sound is recorded only when the respective film camera is operating, i.e. the respective length of sound is recorded concurrently with the picture. In practice, this is attained in the following manner:

(a) In the case of ordinary tape-recorders, a separate one is used for each camera. Such a tape recorder operates throughout the entire episode and it records silence when the corresponding camera is not filming anything. This is the preferred arrangement.

(b) In the case of use of special operating devices, the apparatus is switched on for operation and it records only when the corresponding camera is operating.

(c) The sound is recorded on a common sound track, and the working section, for the purpose of further recording, is determined for each camera through additional tracks with pre-arranged accompanying signals or transversely situated recording heads.

(d) The sound is recorded on a multi-track recorder with observance of the principles involved in items (a) and (c).

(2) Montage cutting.—In order to be able, during the process of work, to determine the places for cutting-in, for montage cuttings, etc., an attachment has been designed in the system of the basic and additional pulses. It provides, on the basis of hand-actuation by pressing, for obtaining additional marking (of the point type, for instance) on the principle of the operating sound-and-light marking. The attachment is set in operation by an automatically returning button.

(3) A regulator for the light intensity of the bulb providing the light for the profile of the light marking, by means of which it is possible to obtain such conditions of operation that the tracer effect of the strip of light shall disappear for a moment, or a regulator for the intensity of the source of light (illuminating the profile) of the glow-lamp type, ionized light, or spot-like spark fed with alternating current.

(4) Automatic return button for introducing tone.

(5) The cameras and the panel have two control lights, one for rehearsal and one for filming. When the rehearsal light is on, the motors of the cameras are in a switched-off position. This prevents any expending of cine-film by error.

(6) The light marking device is connected in series with a control bulb or in series with a control indicator on the panel.

(7) A glow-lamp or any other indicator is connected in parallel with the starting switch for the motors of the cameras which shows the voltage existing at the switch. This voltage is cancelled when the camera begins operating.

(8) After the cameras are set in operation, the sound-and-light marking is automatically actuated after a fixed interval of time. This will later make easier the work of the montage technician operating the switching panel and will make easier the starting of the material since the "valve" will be at a standard distance from the original over-exposed square.

What is claimed is:

1. A method for chain-type synchronization of at least two film cameras, said method comprising operating a plurality of film cameras one at a time with overlapping periods during changeover from one camera to another to produce recorded film in said cameras having overlapping sequences, recording sound on separate sound tracks one for each film camera, applying markings on the recorded media of all cameras both in the form of basic markings to indicate the beginning of operation of each respective camera and in the form of additional markings to indicate both its end of operation and the camera which is subsequently in operation thereby to enable combination of the recorded pictures to provide continuity, said basic marking being applied to the film in each camera at the inception of its operation while said additional markings are concurrently applied to the film in all other cameras then operating, said markings being constituted by pulse interruptions and pre-arranged shapes both to distinguish between the basic and additional markings and to indicate the order of operation of the cameras.

2. A method as claimed in claim 1 wherein the sound is recorded on separate recorders one associated with each camera.

3. A method as claimed in claim 2 wherein the sound is recorded in each recorder concurrently with the exposure of the film in the assocaited camera.

4. A method as claimed in claim 1 wherein the basic marking is constituted by a marking applied to the film and to the associated sound track and the additional marking is constituted by a marking applied only to the film.

5. A method as claimed in claim 1 wherein the marking is a pulse type interruption of the film and sound track markings in which a pre-determined number of pulses for each camera is employed for basic and additional markings.

6. A method as claimed in claim 5 wherein the marking on the film is a visible marking obtained from the profile prearranged for each camera and illuminated from a source of light with a number of pulses in accordance with the basic or additional marking at the time.

7. A method as claimed in claim 1 wherein the differentiation between the basic and additional light markings is obtained from the coinciding or non-coinciding combination between a pre-arranged number of profiles and a pre-arranged number of pulses characteristic for each camera.

8. A method as claimed in claim 1 wherein the basic and additional film markings lie in the same area of the film.

9. A method as claimed in claim 5 wherein each of the sound track pulses has a pre-arranged frequency for each camera.

10. A method as claimed in claim 1 comprising regulating the light intensity of a source of light which illuminates the profile pre-arranged for each camera.

11. A method as claimed in claim 1, wherein the basic and additional film markings lie in different areas of the film.

References Cited

UNITED STATES PATENTS

| | | | |
|---|---|---|---|
| 2,649,016 | 8/1953 | Fairbanks | 352—24 |
| 2,673,485 | 3/1954 | Roderick | 352—24 |
| 2,803,988 | 8/1957 | Ranger | 352—17 |
| 1,950,091 | 3/1934 | Owens | 352—24 |
| 2,901,939 | 9/1959 | Van Osch | 352—22 |
| 3,266,862 | 8/1966 | Wagoner | 352—12 |

NORTON ANSHER, Primary Examiner

D. S. STALLARD, Assistant Examiner

U.S. Cl. X.R.

352—24